Aug. 8, 1967  R. O. ANDERSON  3,334,711
HYDRODYNAMIC BRAKE AND SPEED CONTROLLED FRICTION BRAKES
Filed Dec. 15, 1964  5 Sheets-Sheet 3

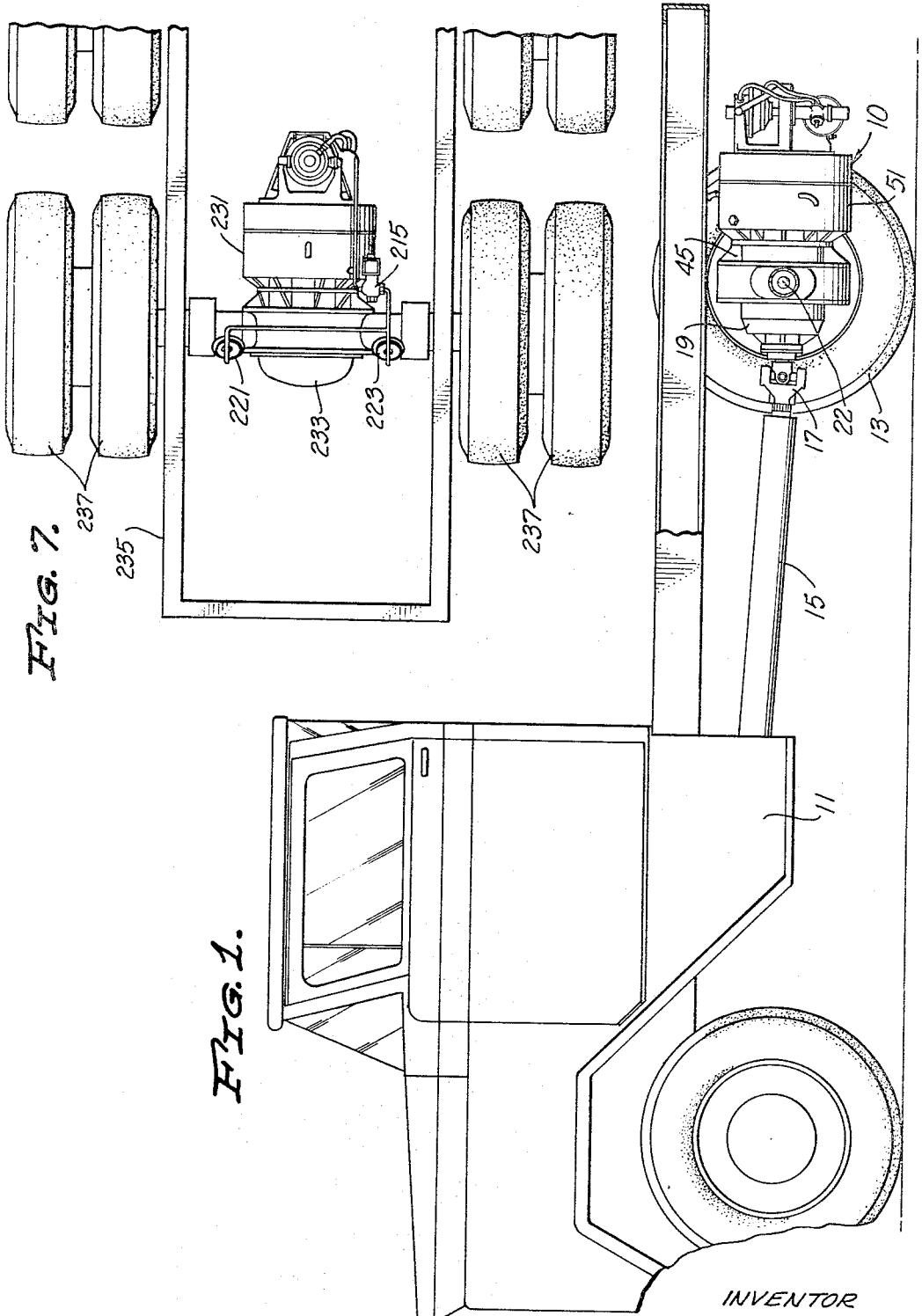

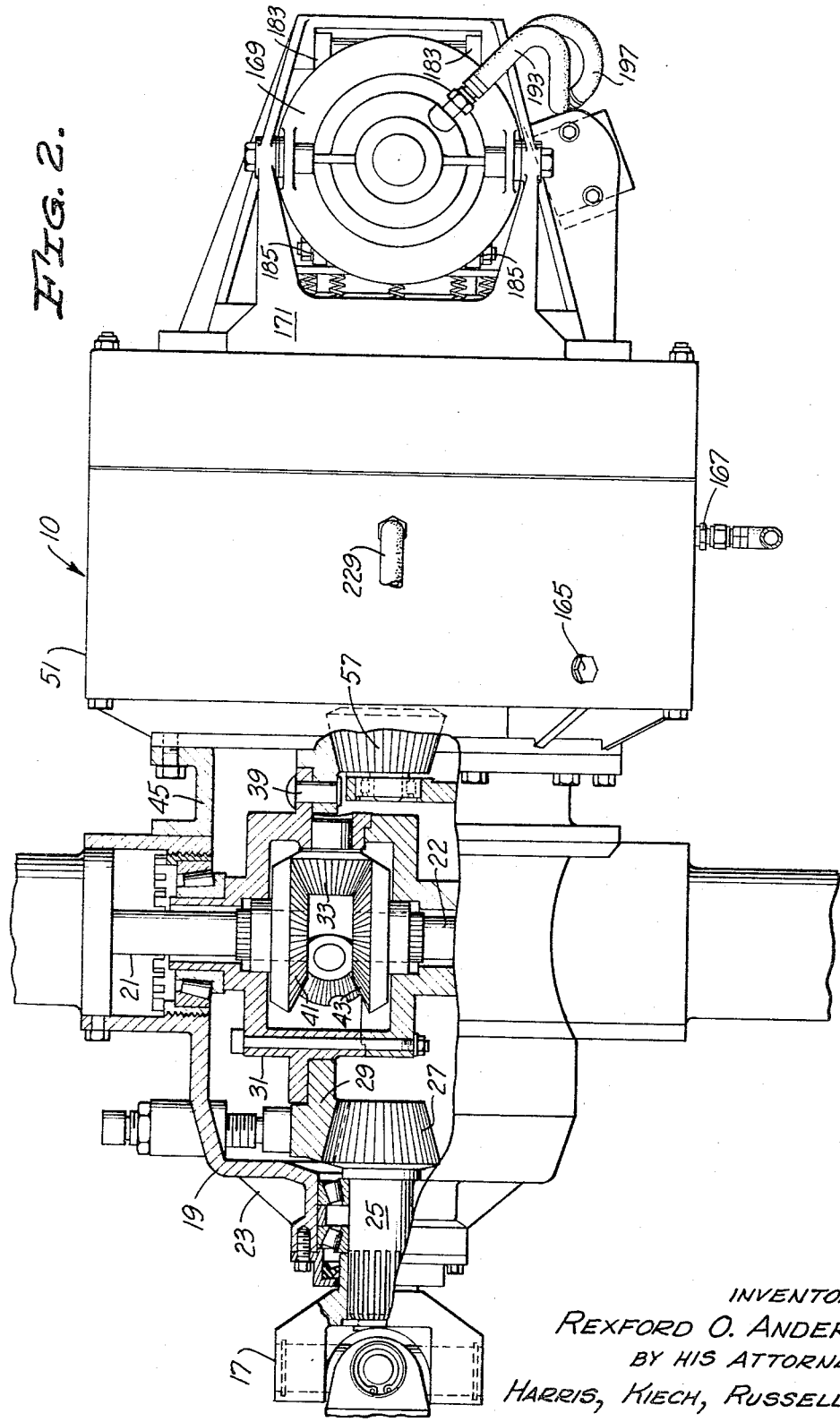

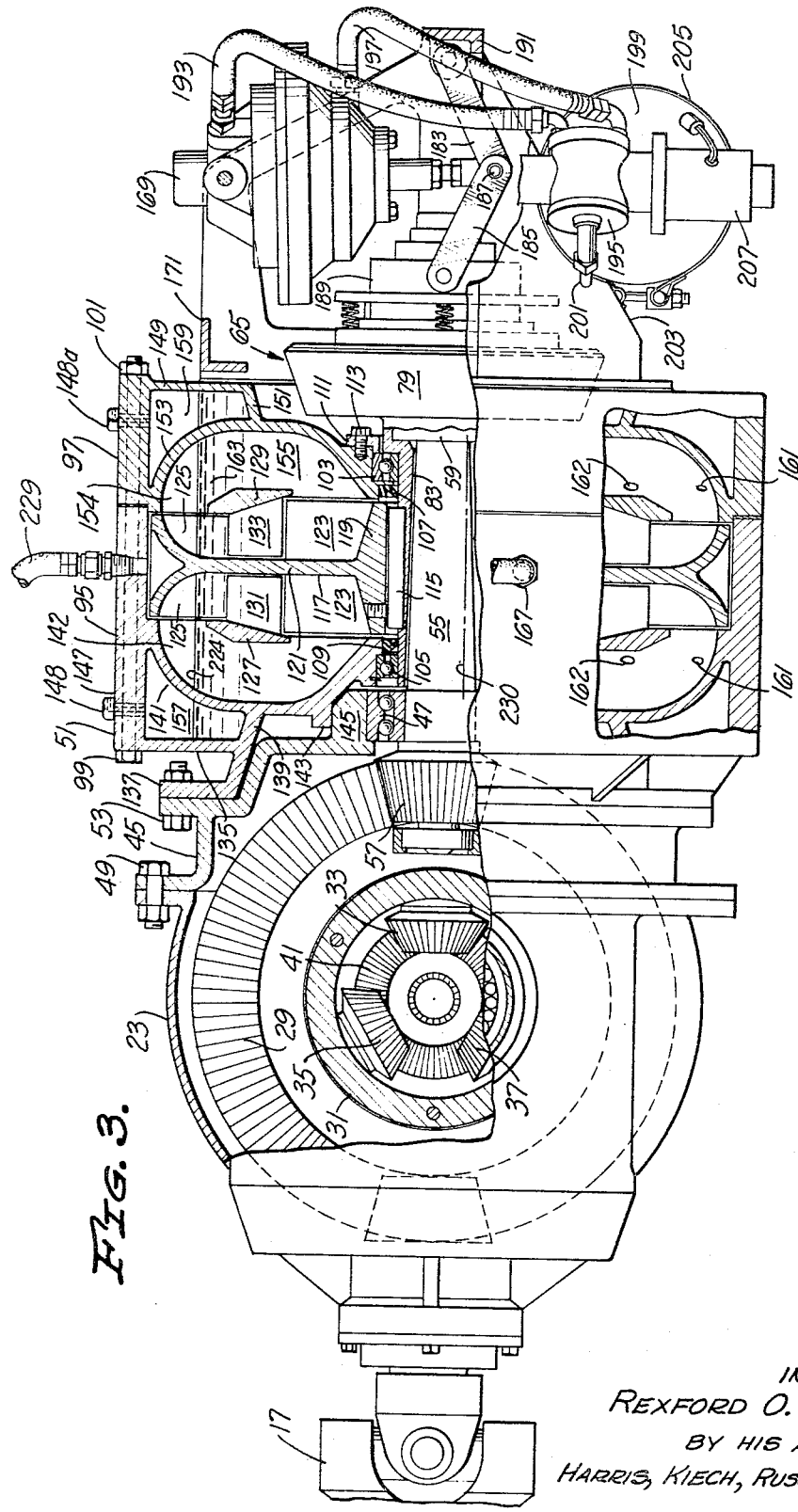

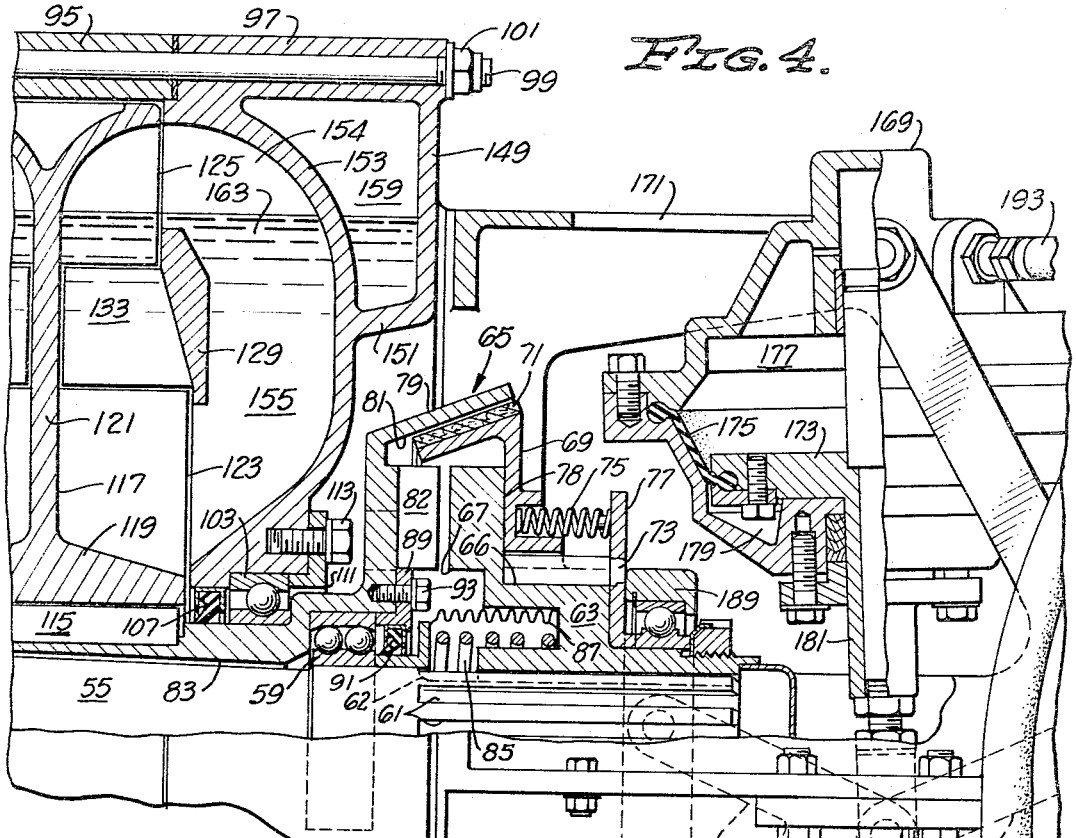
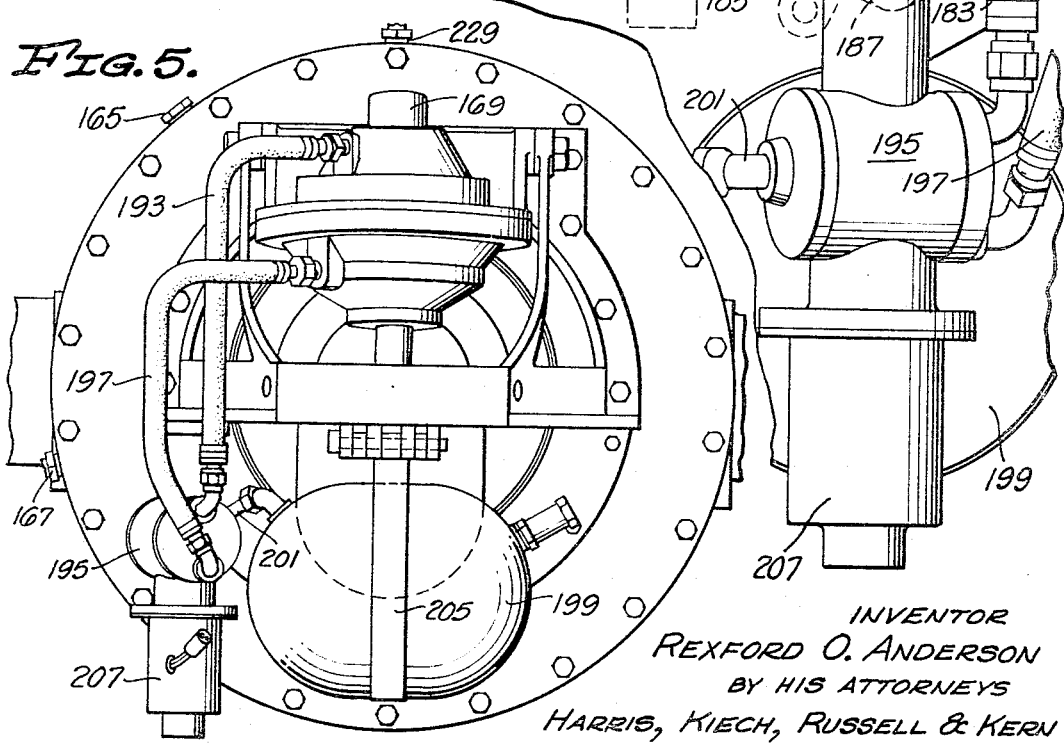

INVENTOR
REXFORD O. ANDERSON
BY HIS ATTORNEYS
HARRIS, KIECH, RUSSELL & KERN

United States Patent Office 3,334,711
Patented Aug. 8, 1967

3,334,711
HYDRODYNAMIC BRAKE AND SPEED
CONTROLLED FRICTION BRAKES
Rexford O. Anderson, 8851 Katherine Ave.,
Van Nuys, Calif. 91402
Filed Dec. 15, 1964, Ser. No. 418,522
7 Claims. (Cl. 188—86)

This invention relates to a braking system and, more particularly, to a fluid brake which is adapted to be integrally connected to a differential of a large vehicle.

Large vehicles such as trucks and tractor-trailer combinations possess high kinetic energy at ordinary road speeds. Accordingly, the problems associated with braking such large vehicles to a slower speed or to a stop are particularly acute. The conventional braking system for large vehicles relies on abrasive contact between two members to reduce the speed of the vehicle. Such a braking system is subject to abrasive deterioration which ultimately causes destruction of several of the elements of the system such as the brake lining. As these elements which are destroyed by abrasion must be replaced, maintenance cost of the vehicle is increased. The conventional friction-type braking system is also unsatisfactory from the standpoint of safety. For example, friction brakes frequently lock the wheels to cause skidding of the vehicle and at times poorly distribute the braking power between the tractor and trailer to thereby cause jack-knifing of the two units. Friction brakes also may fail to operate for the required period of time as where a truck is proceeding down a long incline and the abrasive elements, because of the huge amount of energy they have absorbed in retarding movement of the truck, burn out. Furthermore, the friction brake of the prior art often prematurely applies braking force to the front wheels thereby making steering of the vehicle more difficult.

Accordingly, it is an object of this invention to provide a braking system which prevents locking of the affected wheels and subsequent skidding of the vehicle on the road surface. This prevents the jack-knifing of a tractor and trailer combination. The braking system of the invention is safer and more reliable than those braking systems of the prior art with which it can operate in conjunction as an alternate system or as a substitute system.

It is a further object of this invention to provide a fluid braking system in which the braking elements are not subject to abrasive deterioration thereby reducing maintenance cost.

Another object of this invention is to provide a fluid brake within a housing which is rigidly secured to the differential of a vehicle to form a unitary assembly therewith.

It is a particular object of this invention to provide a braking system including a fluid brake which acts to reduce vehicle velocity by circulation of a fluid within a brake housing. The brake housing contains walls forming an operating chamber and a reservoir. An impeller is mounted for rotation in the operating chamber and the walls contain ports to communicate the operating chamber with the reservoir. A suitable fluid is provided in the reservoir and operating chamber. When braking action is desired, a rotatable element associated with the wheels of the vehicle causes the impeller to rotate to circulate fluid within the operating chamber, the energy utilized in circulating the fluid being used to brake the vehicle. In accordance with a further object of this invention the reservoir is disposed adjacent an outside wall of the housing so that fluid circulating between the operating chamber and the reservoir may be cooled by the air adjacent the housing.

Still another object of this invention is to provide novel means for actuating the impeller of the fluid brake. To transmit rotation from a rotating element associated with the wheels of the vehicle to the impeller, a normally disengaged clutch is provided. To engage the clutch and cause the impeller to rotate, a pair of toggle levers and an actuator are provided. Thus, by proper positioning of the toggle levers, movement of the actuator can be transmitted through the toggle levers to engage the clutch.

Another object of this invention is to provide a braking system having a clutch with two positions of engagement for actuating a fluid brake. The clutch includes a driving and a driven member, each of which has engageable friction surfaces and interengageable teeth. The friction surfaces are engaged first to reduce the relative rotational velocity between the driving and driven members, and subsequently the interengageable teeth are engaged to firmly engage the clutch and the fluid brake.

Another object of this invention is to reduce the initial torque and hence the initial shock of braking and eliminate rolling slippage of the tires over the road surface resulting from actuating a fluid brake at high speed. This may be accomplished by using a small pump or a gas under pressure to force some of the fluid from the operating chamber to the reservoir to thereby leave only a small quantity of fluid in the operating chamber when the fluid brake is initially actuated.

In accordance with another object of the invention, control means are provided which automatically actuate a set of friction brakes at a relatively low vehicle speed to assist in bringing the vehicle to a complete stop. More particularly, the variations in velocity head pressure of the fluid within the operating chamber of the fluid brake are used to actuate a set of friction brakes. To accomplish this, a set of air operated friction brakes is connected to a pressure responsive pilot valve. The pilot valve functions to control the supply of air to the friction brakes. The pilot valve is arranged to allow air flow to the friction brakes to actuate them in response to a predetermined velocity head pressure of the fluid in the operating chamber. Thus, the friction brakes are automatically applied in response to a predetermined condition in the fluid brake.

The invention, both as to its organization and method of operation, together with further objects and advantages thereof, may best be understood by reference to the following description taken in connection with the accompanying drawings. The drawings merely show and the description merely describes preferred embodiments of the present invention which are given by way of illustration or example.

In the drawings:

FIG. 1 is a side elevation of a truck employing one embodiment of the braking system of the present invention;

FIG. 2 is a plan view partially in section showing the fluid brake and its associated controls;

FIG. 3 is a side elevational view partially in section of the fluid brake and its associated controls;

FIG. 4 is a fragmentary view partially in section showing the means for actuating the fluid brake;

FIG. 5 is an end elevational view showing some of the controls used to actuate the braking system of the present invention;

FIG. 7 is a fragmentary plan view showing another embodiment of the braking system attached to the axle of a trailer.

Figure 6:
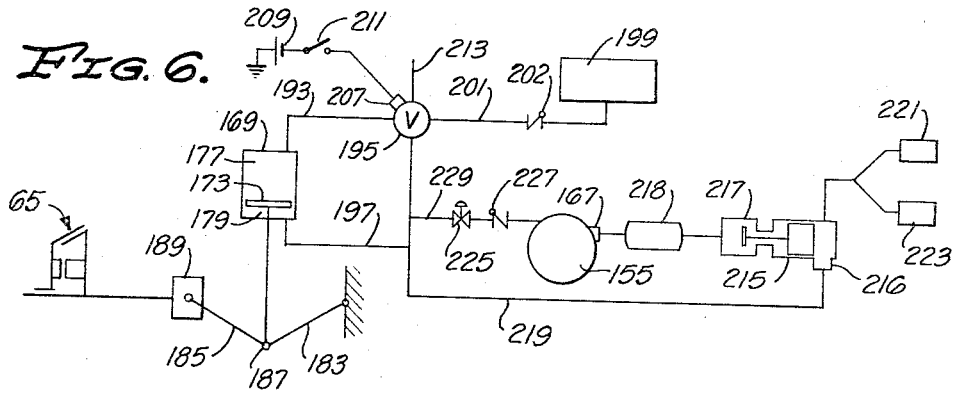
FIG. 6 is a control diagram showing the controls used to actuate the fluid brake and friction brake of the braking system of this invention.

FIGS. 1 through 3 show the manner in which a fluid brake 10 is secured to a truck or vehicle 11. The truck 11 transmits power to a set of rear wheels 13 through a drive shaft 15, a universal joint 17, a differential 19, and a pair of shafts 1 and 22. The differential is of the conventional type and includes a differential housing 23 containing a splined shaft 25 having a pinion 27 at one end thereof which meshes with a ring gear 29. A casing 31 having a plurality of pinions 33, 35, and 37 mounted for rotation therein is secured to the ring gear 29 by a plurality of rivets 39 and rotates therewith. Meshing with the pinions 33, 35, and 37 is a pair of side gears 41 and 43 which are rigidly mounted on the shafts 21 and 22, respectively. Thus, this differential gearing serves to transmit motion to the rear wheels 13 of the vehicle 11.

A housing extension 45 carrying a bearing 47 is attached to the differential housing 23 by a suitable number of bolts 49. A fluid brake housing 51 is suitably secured to the housing extension 45 as by a suitable number of bolts 53.

A shaft 55 having a pinion 57 at one end thereof which meshes with the ring gear 29 is mounted for rotation in the housing 51 by the bearing 47 and another bearing 59 (FIG. 4). The shaft 55 is provided with splines 61 at its other end which engage internal splines 62 in a clutch body or driving member 63 of a clutch 65. The clutch body 63 which longitudinally slidable and rotatable with the shaft 55 has a stepped circular outer surface 66 and is provided with a plurality of teeth or dental elements 67. An annular clutch hub 69 carrying frictional material 71 around its periphery is keyed to the clutch body 63 by a plurality of keys 73 to allow relative longitudinal movement between the hub 69 and the clutch body 63. A plurality of springs 75 bears against a plate 77 which is secured to the clutch body 63 and urges the longitudinally slidable clutch hub 69 into engagement with a clutch body surface 78.

A generally frusto conical or dish-shaped clutch element or driven member 79 having an internal surface 81, which is adapted to engage the friction material 71, and a plurality of dental elements or teeth 82, which face and are adapted to interengage with the teeth 67, is formed integrally with a hollow impeller shaft 83. The clutch body 63 is normally biased to the right by a spring 85, which is surrounded by a bellows-type seal 87, as shown in FIG. 4, so that neither the friction material 71 and the internal surface 81, nor the teeth 67 and 82, engage. Thus, the clutch 65 is normally held in a disengaged position by the spring 85. A collar 89 secures the bearing 59 and a seal 91 in position around the shaft 55 and is itself secured to the generally frusto conical clutch element 79 by suitable threaded fasteners 93.

To engage the clutch 65, clutch body 63, which rotates with the shaft 55, is moved to the left, as shown in FIG. 4, by a means which will be subsequently described until the friction material 71 engages the nonrotating internal surface 81 of the generally frusto conical clutch element 79 to cause the hollow impeller shaft 83 to commence rotation. As the clutch body 63 continues its leftward movement the friction material 71 and the internal surface 81 are urged more tightly together by the springs 75 to reduce the relative rotational velocity therebetween. When the friction material is firmly seated on the internal surface 81, movement of the clutch hub 69 to the left is halted thereby. As the clutch body 63 is slidable longitudinally with respect to the clutch hub 69, leftward movement of the former continues until the teeth 67 contact and interengage with the teeth 82. The clutch is now firmly engaged. Thus, the clutch 65 has two positions of engagement. In the first, frictional engagement of the friction material 71 and the internal surface 81 reduces the relative rotational velocity between the clutch body 63 and the clutch element 79 sufficiently to allow the teeth 67 and 82 to interengage (second position of engagement) without undue shock.

The fluid brake housing 51 includes a section 95 (FIGS. 3 and 4) and another section 97 secured together by a plurality of elongated bolts 99 and nuts 101. The hollow impeller shaft 83 is mounted for rotation over the shaft 55 by the bearing 59 and a pair of external bearings 103 and 105. The bearings 103 and 105 are sealed by shaft seals 107 and 109, respectively, and the bearing 103 is held in place by a collar 111 which is secured to a portion of the housing section 97 by threaded fasteners 113. Secured to the hollow impeller shaft 83 by a plurality of keys 115 is an impeller 117 which is free to rotate with the impeller shaft 83. The impeller 117 includes a hub 119 which is integral with a radial web 121, a plurality of impeller blades 123 which are secured to the hub 119 and the radial web 121, and a plurality of impeller vanes 125 which are secured to the outer portion of the radial web 121. A pair of fixed rings 127 and 129 which are suitably secured within the fluid brake housing 51 carry a plurality of baffle blades or deflecting vanes 131 and 133, respectively, on their inner surfaces. The impeller 117 and its associated rings 127 and 129 and baffle blades 131 and 133 are similar to those disclosed in U.S. Patent No. 2,150,439 issued to Carson et al.

The impeller 117 and the fixed rings 127 and 129 are surrounded by the fluid brake housing sections 95 and 97. The fluid brake housing section 95 includes an annular outer wall 135, an annular flange 137 for securing the fluid brake housing to the housing extension 45, and an annular reservoir bottom wall 139. The housing section 95 also includes a curved annular partition 141 contoured to form a plurality of radial channels 142 on the inner surface thereof which extend inwardly from the outer circumference of the annular partition substantially as described in the aforementioned patent. The housing section 95 also includes an annular flange 143 which rests on a nose portion 145 of the housing extension 45 and a peripheral or side wall 147 having conventional baffled air vents 148 and 148a therein which allow air but not liquid or solid contaminants to pass therethrough.

The fluid brake housing section 97 is formed similar to the housing section 95 in that it has an annular outer wall 149, an annular reservoir bottom wall 151, and a curved partition 153 forming a plurality of radial channels 154 which are similar to the channels 142. Thus, the volume enclosed between the partitions 141 and 153 and the side wall 147 forms an annular operating chamber 155. That is, the volume consisting of the plurality of channels 142, 154 and the space occupied by the impeller 117 comprise the operating chamber 155. Within the housing section 95, an annular reservoir 157 is defined by the walls 135, 139, and 147 and the partition 141. The corresponding walls in the housing section 97 form another annular reservoir 159 which is interconnected with the reservoir 157 by a plurality of ports (not shown) located at the peripheries of each of the reservoirs. A plurality of outer or high pressure ports 161 and larger inner or negative pressure ports 162 is located in the lower portion of each of the partitions 141 and 153 (FIG. 3) so as to be beneath and to allow circulation of a fluid 163 between the operating chamber 155 and the reservoirs 157 and 159. The fluid 163 is preferably a liquid and may include water, Prestone, or oil, and mixtures thereof.

The reservoirs and operating chamber are filled through a port 165 (FIGS. 2 and 5) which passes through the outer wall of one of the reservoirs 157 and 159. A velocity head sensing port 167 (FIG. 5) extends through the outer wall of the operating chamber 155.

Thus, the fluid 163 is admitted to the operating chamber 155 and the reservoirs 157 and 159 through the port 165, and when the fluid brake 10 is actuated, the impeller 117 circulates the fluid 163 within the operating chamber 155 and a portion thereof flows through the high pressure ports 161 to the reservoirs 157 and 159. The fluid 163 in the reservoirs returns to the operating chamber 155 through the negative pressure ports 162.

As is well known, an impeller rotating in a fluid or liquid will cause the liquid to move, the energy of the moving liquid creating a velocity head pressure. The velocity head pressure of the circulating fluid 163 can be sensed in a conventional manner through the port 167. The velocity head pressure is preferably measured at the periphery of the impeller 117 where it has a maximum value. When the impeller 117 begins rotating, the velocity head pressure rapidly increases to a maximum and then decreases as the square of impeller speed decreases. This variation in velocity head pressure is used in a control system which is subsequently described.

It is apparent, therefore, that to actuate the fluid brake 10, the clutch 65 must be engaged. When the clutch is engaged, the impeller 117 rotates in the liquid 163 and circulates the liquid in a plurality of vortex streams confined between the radial web 121 and the channels 142, 154, the fluid being impelled radially outward by the impeller blades 123 into the deflecting vanes 131 and 133 where its direction of flow is changed to oppose the impeller vanes 125, which in turn impel it axially into the channels which force it inwardly, counter directionally to the rotation of the impeller to impact on the impeller blades. The cycle is then repeated. The amount of energy required is roughly equivalent to the amount of braking work which is obtained from the brake. It is apparent that by employing liquids of different viscosities, employing liquids in different amounts, and by utilizing impeller designs the energy absorbed by the fluid brake may be varied.

While the brake is actuated, the energy absorbed by the brake will be dissipated in the form of heat which raises the temperature of the fluid 163 in the operating chamber 155. The vortex stream causes the fluid 163 in the operating chamber adjacent the high pressure ports 161 to be at a relatively high velocity head pressure and the fluid adjacent negative pressure ports 162 to be at a negative pressure. Therefore, while some of the fluid 163 circulates in the operating chamber 155, other portions of the warm fluid pass through the high pressure ports 161 to one of the reservoirs 157 and 159 where it is cooled by the air passing over the outside walls of the reservoirs. The cooled liquid returns through the negative pressure ports 162 to the operating chamber 155.

Means are provided to engage and disengage the clutch 65. An actuator housing 169 is pivotally attached to a generally U-shaped support 171 which is suitably secured to the housing section 97. Within the actuator housing 169 is a piston 173 which, along with a flexible annular seal 175, divides the actuator housing into an upper chamber 177 and a lower chamber 179 (FIG. 4). The piston 173, which is movable longitudinally within the actuator housing 169, has a rod 181 mounted for movement along a predetermined path and extending downwardly through the bottom wall of the actuator housing. A first pair of links or toggle levers 183 and a second pair of links 185 (FIG. 3) are pivoted about a common axis 187 on the rod 181. The other ends of the links 185 are pivotally secured to a yoke 189 which is suitably secured to the clutch body 63. The other ends of the links 183 are pivotally connected to a rigid support 191 which is suitably secured to the housing section 97. Thus, when the piston 173 is in the depressed position shown in FIG. 4, the clutch body 63 is positioned to the right as seen in FIG. 4 so that the friction material 71 and the internal surface 81 are not in engagement and the clutch 65 is accordingly disengaged. As the piston 173 is moved upward as viewed in FIG. 4, by means which will be subsequently described, the pivotally mounted links 183 and 185 urge the clutch body 63 to the left to engage the clutch 65. With the clutch 65 engaged, rotary motion is transmitted from the shaft 55 to the impeller 117 in the manner described previously.

Means (FIG. 6) are provided to control the reciprocating motion of the piston 173. A conduit 193 connects the upper chamber 177 of the actuator housing 169 with a solenoid valve 195 and another conduit 197 connects the solenoid valve with the lower chamber 179. The solenoid valve 195 is a commercially available four-way air valve. The inlet port of the solenoid valve 195 is connected to an air supply tank 199 through a conduit 201 and a check valve 202. The air supply tank 199 is rigidly secured to a bracket 203 (FIG. 3) by a retaining band 205 which partially encircles it. The air supply tank 199 provides a sufficiently large quantity of air under pressure to quickly actuate the fluid brake. The solenoid valve 195 has an actuator section 207 which is connected to a source of electric current 209 through a switch 211 which may be closed by an operator when braking is desired. The switch 211 may be closed by depressing the brake pedal of the vehicle in which the fluid brake is incorporated.

When the fluid brake is disengaged, the normally open solenoid valve 195 supplies fluid such as air to the upper chamber 177 of the actuator housing 169 to hold the piston 173 in a depressed position to thereby keep the clutch 65 and the fluid brake disengaged. During this time, the solenoid valve 195 also vents the lower chamber 179 of the actuator housing 169 to the atmosphere through a vent 213 shown diagrammatically in FIG. 6. When the switch 211 is closed, the solenoid valve 195 supplies air under pressure to the lower chamber 179 and vents the upper chamber 177 to the atmosphere through vent 213. The piston 173 is therefore caused to move upward to engage the clutch 65 and to actuate the fluid brake. To disengage the clutch 65, the switch 211 is opened and the valve will cause the piston 173 to assume its original depressed position.

The fluid brake is very effective in slowing heavy vehicles from a high speed down to a considerably lower speed such as ten miles per hour. It may be desirable that another braking system of the friction brake type be employed to slow the vehicle from this lower speed to a halt. Accordingly, means is provided which is preferably responsive to the velocity head pressure of the fluid 163 in the operating chamber 155 to engage a set of friction brakes. A normally open pilot valve 215 (FIG. 6) of a type which is commercially available and equipped with a conventional time delay device 216 and an actuating chamber 217 is provided. The pilot valve 215 is normally spring biased to an open position. The actuating chamber 217 of the pilot valve 215 is connected to the velocity head sensing port 167 through a surge tank 218, and the inlet of the pilot valve is connected to the solenoid valve 195 and the lower chamber 179 of the actuator housing 169 through a conduit 219 and the conduit 197. The outlet of the pilot valve 215 is connected to a pair of brake cylinders 221 and 223 for a set of friction brakes (not shown).

When the switch 211 is closed, the solenoid valve 195 supplies air to the lower chamber 179 and through the conduits 197 and 219 to the time-delay device 216 of the valve 215. The time delay device 216 delays delivery of this air under pressure for a given period of time. During this period of delay, the velocity head pressure within the operating chamber 155 is increasing, and before the period of delay has expired the velocity head pressure will be sufficient to close the normally open pilot valve 215. Shortly thereafter the time delay device 216 allows the air under pressure to reach the normally open pilot valve 215; however, the pilot value is at this time, closed by the velocity head pressure from the operating chamber 155. Accordingly, no air is at this time supplied to the friction brake cylinders 221 and 223. As the fluid brake 10 continues to function, the speed of the vehicle and, hence, the speed of the impeller are reduced. As the angular velocity of the impeller decreases, the velocity head pressure experiences a corresponding decrease until, when the velocity head pressure has reached a predetermined value, it is no longer capable of holding the normally open pilot valve 215 in a closed position. This will normally occur when the vehicle is traveling at approximately ten miles per hour. When this occurs, the pilot valve 215 will open under the action of its spring and allow fluid under pressure to reach the friction brake cylinders 221 and 223 to operate the set of friction brakes and bring the vehicle to a halt. It should be understood that the time-delay device 216 need only delay the passage of air to the pilot valve 215 for a very short interval of time as the velocity head pressure in the operating chamber 155 will normally build up to a maximum in approximately five revolutions of the impeller 117.

When the clutch 65 is engaged at high speed, for example, about fifty to sixty miles per hour, the torque capacity of the fluid brake may be excessive for the tire-road friction condition thereby tending to cause excessive initial braking and rolling slippage of the tires over the road. Thus, it is often desirable to reduce the torque capacity of the fluid brake at high speed engagements to assure that the initial braking will be substantially reduced and rolling slippage of the tires over the road will not occur. The torque capacity may be reduced by lowering the level of fluid 163 within the operating chamber when the brake is initially actuated from a normal level 224, which the fluid will assume when it is substantially undisturbed by the impeller or other external forces. This may be accomplished by providing a pressure regulating valve 225 and a check valve 227 in a conduit 229 which is connected between the conduit 219 and the operating chamber 155 as shown diagrammatically in FIG. 6. Thus, when the solenoid valve 195 applies air to the lower chamber 179, air is also supplied through the conduit 229, the pressure regulating valve 225, and the check valve 227 to the operating chamber 155. This air pressure forces some of the liquid 163 in the operating chamber 155 through the ports 161 and 162, all of which are located in the lower portion of the operating chamber beneath the level of liquid into the reservoirs 157 and 159. The level of the liquid 163 in the operating chamber 155 is accordingly depressed from the normal level 224 preferably until the operating chamber is about half full as shown by the liquid level 230 in FIG. 3. The air displaced in the reservoirs 157 and 159 by the fluid passes through the vents 148 and 148a to the atmosphere.

The pressure regulating valve 225 supplies air at the proper pressure to depress the fluid level in the operating chamber the desired amount. This pressure also acts through the operating chamber 155 and the surge tank 218 on the actuating chamber 217 of the normally open pilot valve 215. However, the pressure regulating valve 225 regulates the pressure of the air supplied to the operating chamber 155 from the air supply tank 199 so that it alone is insufficient to close the normally open pilot valve 215. The check valve 227 closes when the velocity head pressure exceeds the regulated air pressure. Accordingly, velocity head pressure from the operating chamber 155 is still required to close the normally open pilot valve 215.

Thus, the pressure regulating valve 225 maintains a lower fluid level in the operating chamber 155 when the fluid brake is actuated. Witht less fluid 163 in the operating chamber 155 when the impeller 117 begins to rotate, the torque capacity of the fluid brake is obviously less than it would be if the fluid were supplied to the operating chamber in a greater quantity. This lesser initial torque capacity tends to reduce the possibility that rolling slippage may occur when the fluid brake is initially actuated.

For a given fluid 163, the torque capacity of the fluid brake is proportional to impeller speed and the fluid level in the operating chamber 155. As explained above, when the fluid brake is actuated impeller speed is relatively high and the fluid level is relatively low to produce the desired torque capacity. Portions of the circulating liquid 163 carry the air from the operating chamber 155 through the ports 161 into the reservoirs 157 and 159 where it separates from the liquid. Simultaneously, the liquid is drawn from the reservoirs through the low pressure ports 162 into the operating chamber and in greater quantity than the discharge through the high pressure ports 161 as the impeller speed decreases. The effect of the rising fluid level and the decreasing impeller speed is to make the torque capacity generally constant throughout much of the braking cycle.

FIG. 7 shows another embodiment of the fluid brake in which the brake is attached to a differential on a trailer. A fluid brake 231 is connected to a differential 233 on a trailer 235 having a plurality of wheels 237. The fluid brake 231 is the same as that previously described. In FIG. 7, the normally open pilot valve 215 and the friction brake cylinders 221 and 223 are shown.

Figure 8:
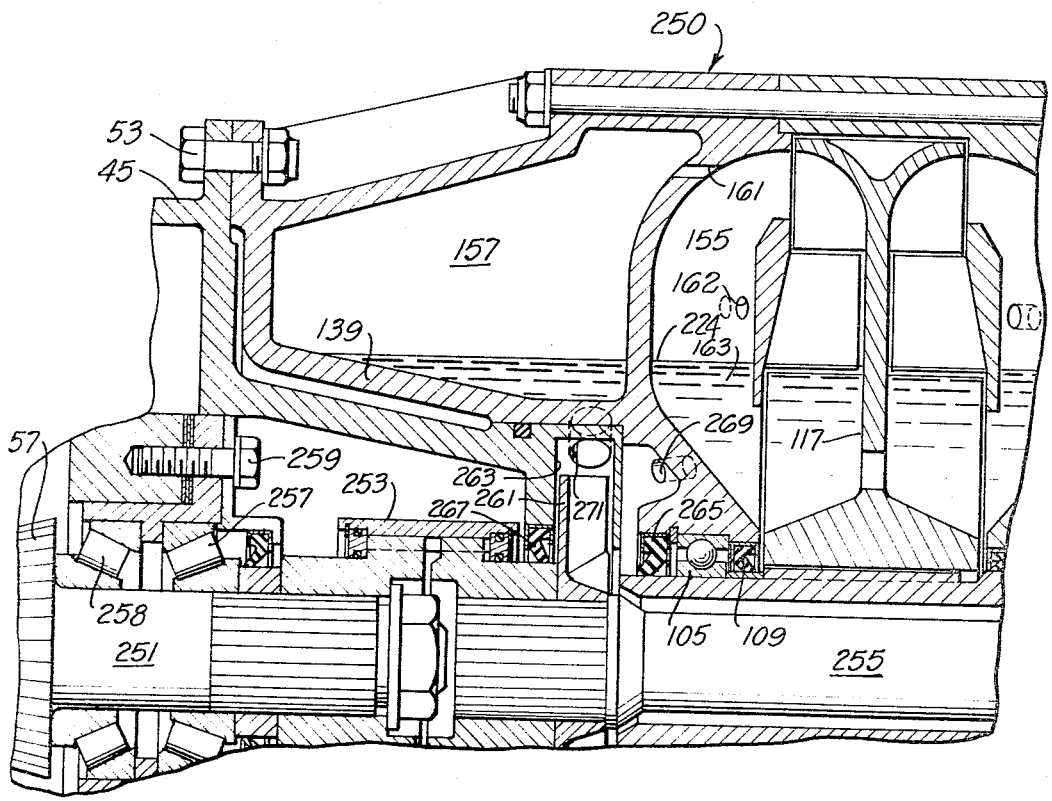
FIG. 8 is a fragmentary sectional view of still another embodiment of the fluid brake.

FIG. 8 depicts still another embodiment of the present invention in which alternate means for reducing the torque capacity of the fluid brake at high speeds is provided. In FIG. 8, the corresponding parts of the fluid brake are identified by the same reference numerals. In the particular embodiment illustrated in FIG. 8, the torque capacity is reduced by means which pump fluid out of the operating chamber 155 into the reservoirs 157 and 159 to thereby maintain the level of fluid in the operating chamber below the normal level 224 in the reservoir. With less fluid 163 in the operating chamber 155 when the impeller 117 begins to rotate, the braking action of the fluid brake is obviously less than it would be if the fluid were supplied to the operating chamber in a greater quantity. As indicated above, this lesser initial braking action substantially reduces the initial braking and the possibility that rolling slippage may occur.

In FIG. 8 a fluid brake 250 is shown as having a shaft 251 which is secured to the pinion 57 and connected by a coupling 253 to another shaft 255. The shaft 251 is rotatably mounted by a pair of bearings 257 and 258, which are secured to the housing extension 45 by a threaded fastener 259. Mounted on the shaft 255 for rotation therewith is a pump 261 which is surrounded by pump housing 263 and which pumps fluid 163 from the operating chamber 155 to the reservoirs. The pump housing 263 is provided with a pair of annular seals 265 and 267. The pump housing communicates with the operating chamber 155 through a port 269 and communicates with the reservoir 157 through a port 271. In this embodiment, the reservoir 157 is elongated and the reservoir bottom wall 139 engages the top of the pump housing 263.

When this unit is installed on the differential of a vehicle, and the vehicle is moving, the pump 261 continually pumps the fluid 163 from the operating chamber 155 to the reservoir 157 to thereby lower the level of fluid in the operating chamber. Of course, some of the pumped fluid will return to the operating chamber through the ports 162. When the fluid brake 250 is actuated and the impeller 117 begins to rotate, the lower level of fluid in the operating chamber will prevent the fluid brake from applying an excessive retarding action to the wheels of the vehicle. At the instant the brake is actuated, the pumping pressure of the pump 261 tending to pump fluid from the operating chamber 155 to the reservoir 157 is greater than the suction force exerted by the impeller, which tends to draw fluid from the reservoir into the operating chamber. After a few revolutions of the impeller 117, the suction created by the impeller increases until it exceeds the pumping discharge of the pump 261 and the operating chamber 155 then fills.

For any given fluid 163, the retarding action of the brake is a function of impeller speed and the amount of fluid in the operating chamber. At high vehicle speeds, the speed of the impeller 117 is correspondingly great, but the level of fluid in the operating chamber 155 is relatively low to produce the desired torque or retarding action for the vehicle. As the speed of the vehicle decreases, the angular speed of the impeller 117 experiences a corresponding decrease. If the level of fluid in the operating chamber were to remain constant, the torque or braking action would likewise decrease. However, because the suction created by the impeller 117 gradually overcomes and exceeds the pumping discharge of the pump 261, the operating chamber 155 gradually fills with fluid to maintain the torque capacity of the vehicle at the desired level during deceleration.

The specific embodiments disclosed may be subjected to various changes, modifications, and substitutions without necessarily departing from the spirit of the invention.

What is claimed is:

1. A braking system for connection to a rotating element comprising:
   fluid brake means for braking the rotation of said element, said fluid brake means when actuated agitating a fluid to produce velocity head pressure;
   fluid pressure responsive means for selectively actuating and releasing said fluid brake means;
   friction brake means responsive to fluid under pressure for braking the rotation of said element;
   means for simultaneously supplying fluid under pressure to said fluid pressure responsive means to actuate said fluid brake means and to said friction brake means;
   a normally open pilot valve for controlling the supply of said fluid under pressure to said friction brake means;
   closing means responsive to a predetermined velocity head pressure of said fluid in said fluid brake means to close said normally open pilot valve;
   time delay means associated with said pilot valve for preventing said fluid under pressure from reaching said pilot valve until said predetermined velocity head pressure in said fluid brake means is attained whereby said fluid under pressure does not reach said pilot valve until said pilot valve is closed by said closing means; and
   means responsive to a predetermined reduction in said predetermined velocity head pressure for opening said pilot valve whereby said fluid under pressure is supplied to said friction brake means to actuate same.

2. A braking system for connection to a rotating member in the differential or axle assembly of a motor driven vehicle, comprising:
   a fluid-containing housing;
   an impeller carrying a plurality of impeller vanes and supported for turning in said housing to circulate liquid in a plurality of vortex streams and to develop a velocity head pressure in said housing;
   a plurality of deflector vanes in said housing for receiving fluid in said vortex streams and for redirecting said fluid to impact on said impeller blades to oppose rotation thereof;
   normally disengaged synchronized positive clutch means for connecting said impeller to said rotating member and for gradually increasing the angular velocity of said impeller to that of said rotating member as said clutch is engaged; and
   means for selectively engaging said clutch.

3. The braking system of claim 2 wherein said clutch means includes a driving member and a driven member, said driving member being mounted for turning with said rotating member and for a movement relative thereto towards said driven member, and said driven member is connected to said impeller such that rotational movement is gradually imparted to said impeller as said driving member moves toward said driven member to engage said clutch.

4. A braking system of claim 2 further including:
   a friction brake;
   sensor means for sensing said velocity head pressure in said housing; and
   means connected to said sensor means for energizing said friction brake in response to a predetermined reduction in said velocity head pressure.

5. The braking system of claim 2 wherein said fluid in said housing is a liquid, said means for selectively engaging said clutch means is responsive to the pressure of a gas applied thereto, and wherein said braking system further includes:
   a reservoir for liquid;
   port means for transporting liquid from said housing to said reservoir and from said reservoir to said housing; and
   means for supplying gas to said housing and to said pressure responsive means to reduce the level of liquid in said housing and hence reduce the initial shock of actuation of said braking system and to engage said clutch to produce a rotation of said impeller in said liquid.

6. A braking system for connection to a rotating member in the differential or axle assembly of a motor driven vehicle, comprising:
   a fluid-containing housing;
   an impeller carrying a plurality of impeller vanes and supported for turning in said housing to circulate fluid in a plurality of vortex streams and to produce a velocity head pressure in said housing;
   a plurality of deflector vanes in said housing for receiving fluid in said vortex streams and for redirecting said fluid to impact on said impeller blades to oppose rotation thereof;
   fluid pressure responsive means for selectively connecting said impeller to said rotating member;
   friction brake means responsive to fluid under pressure for braking the rotation of said rotating member;
   sensor means for sensing said velocity head pressure in said housing; and
   means connected to said sensor means for applying fluid under pressure to said friction brake means in response to a predetermined reduction in said velocity head pressure.

7. The braking system of claim 6 wherein said fluid pressure responsive means for selectively connecting said impeller to said rotating member comprises:
   a normally disengaged clutch means for connecting said impeller to said rotating member and for gradually increasing the angular velocity of said impeller to that of said rotating member as said clutch means is engaged; and
   fluid pressure responsive means for selectively engaging said clutch means.

References Cited

UNITED STATES PATENTS

| 1,694,020 | 12/1928 | Price | 188—86 X |
| 2,177,511 | 10/1939 | Aikman | 188—86 X |
| 2,179,540 | 11/1939 | Burdick | 192—53.2 |
| 2,388,704 | 11/1945 | Potter | 188—90 |
| 2,496,497 | 2/1950 | Russell | 192—124 |
| 2,574,204 | 11/1951 | Woody et al. | 192—85 X |
| 2,889,013 | 6/1959 | Schneider | 188—90 |
| 3,155,197 | 11/1964 | Lee et al. | 188—86 |
| 3,291,268 | 12/1966 | Nagel | 192—4 |

BENJAMIN W. WYCHE III, *Primary Examiner.*